United States Patent [19]

Jin

[11] 4,337,100

[45] Jun. 29, 1982

[54] MAGNETICALLY ANISOTROPIC ALLOYS FOR MAGNETICALLY ACTUATED DEVICES

[75] Inventor: Sungho Jin, Gillette, N.J.

[73] Assignee: Bell Telephone Laboratories, Incorporated, Murray Hill, N.J.

[21] Appl. No.: 194,252

[22] Filed: Oct. 6, 1980

[51] Int. Cl.[3] .............................................. C04B 35/00

[52] U.S. Cl. .............................. 148/31.55; 75/126 C; 148/31.57

[58] Field of Search .................. 75/126 C; 148/31.55, 148/31.57

[56] References Cited

U.S. PATENT DOCUMENTS

| | | | |
|---|---|---|---|
| 1,773,793 | 8/1930 | Sattler | 75/126 C |
| 3,170,112 | 2/1965 | Bungardt et al. | 75/126 C |
| 3,624,568 | 11/1971 | Olsen | 335/153 |
| 3,805,378 | 4/1974 | Archer et al. | 29/266 |
| 4,049,431 | 9/1977 | Hagel et al. | 75/126 C |
| 4,219,356 | 8/1980 | Fujiwara et al. | 75/126 C |
| 4,222,771 | 9/1980 | Oda et al. | 75/126 C |

OTHER PUBLICATIONS

L. R. Moskowitz, Permanent Magnet Design and Application Handbook, Cahners Books, 1976, pp. 211-220.

M. R. Pinnel, "Magnetic Materials for Dry Reed Contacts", IEEE Transactions on Magnetics, vol. MAG-12, No. 6, Nov. 1976, pp. 789-794.

R. M. Bozorth, Ferromagnetism, Van Nostrand, 1959, p. 418.

E. Scheil et al., "Ausscheidungshartung bei Eisen--Chrom-Molybdan-und Eisen-Chrom-Wolfram-Legierungen", Archiv fur das Eisenhuttenwesen, vol. 7, No. 11, May 1934.

Metals Handbook, American Society for Metals, vol. 8, 1973, pp. 421-422.

*Primary Examiner*—John P. Sheehan

*Attorney, Agent, or Firm*—Peter A. Businger

[57] ABSTRACT

Magnetically actuated devices such as, e.g., switches and synchronizers typically comprise a magnetically semihard component having a square B-H hysteresis loop and high remanent induction. Among known alloys having such properties are Co-Fe-V, Co-Fe-Nb, and Co-Fe-Ni-Al-Ti alloys which, however, contain undesirably large amounts of cobalt.

According to the invention, devices are equipped with a magnetically semihard, high-remanence Fe-Cr-Mo alloy which comprises Cr in a preferred amount in the range of 6-26 weight percent and Mo in a preferred amount in the range of 1-12 weight percent. Preparation of alloys of the invention may be by a treatment of annealing, deformation, and aging.

Magnets made from alloys of the invention may be shaped, e.g., by cold drawing, rolling, bending, or flattening and may be used in devices such as, e.g., electrical contact switches, hysteresis motors, and other magnetically actuated devices.

8 Claims, 2 Drawing Figures

MAGNETICALLY ANISOTROPIC ALLOYS FOR MAGNETICALLY ACTUATED DEVICES

TECHNICAL FIELD

The invention is concerned with magnetic devices and materials.

BACKGROUND OF THE INVENTION

Magnetically actuated devices may be designed for a variety of purposes such as, e.g., electrical switching, position sensing, snychronization, flow measurement, and stirring. Particularly important among such devices are so-called reed switches as described, e.g., in the book by L. R. Moskowitz, *Permanent Magnet Design and Application Handbook,* Cahners Books, 1976, pp. 211–220; in U.S. Pat. No. 3,624,568, issued Nov. 30, 1971 to K. M. Olsen et al., in U.S. Pat. No. 3,805,378, issued Apr. 23, 1974 to W. E. Archer et al.; and in the paper by M. R. Pinnel, "Magnetic Materials for Dry Reed Contacts", *IEEE Transactions on Magnetics,* Vol. MAG-12, No. 6, Nov. 1976, pp. 789–794. Reed switches comprise flexible metallic reeds which are made of a material having semihard magnetic properties as characterized by an essentially square B-H hysteresis loop and high remanent induction $B_r$; during operation reeds bend elastically so as to make or break electrical contact in response to changes in a magnetic field.

Among established alloys having semihard magnetic properties are Co-Fe-V alloys known as Vicalloy and Remendur, Co-Fe-Nb alloys known as Nibcolloy, and Co-Fe-Ni-Al-Ti alloys known as Vacozet. These alloys possess adequate magnetic properties; however, they contain substantial amounts of cobalt whose rising cost in world markets causes concern. Moreover, high cobalt alloys tend to be brittle, i.e., to lack sufficient cold formability for shaping, e.g., by cold drawing, rolling, bending, or flattening.

Relevant with respect to Fe-Cr-Mo alloys are the book by R. M. Bozorth, *Ferromagnetism,* Van Nostrand, 1959, p. 418 and the paper by E. Scheil et al., "Ausscheidungshartung bei Eisen-Chrom-Molybdan- und Eisen-Chrom-Wolfram-Legierungen", *Archiv fur das Eisenhuttenwesen,* Vol. 7, No. 11, May 1934, pp. 637–640. Phase diagrams of Fe-Cr-Mo alloys appear in *Metals Handbook,* American Society for Metals, Vol. 8, 1973, pp. 421–422.

SUMMARY OF THE INVENTION

According to the invention semihard anisotropic magnetic properties are realized in Fe-Cr-Mo alloys which preferably comprise Fe, Cr, and Mo in a combined amount of at least 95 weight percent, Cr in an amount in the range of 6–26 weight percent of such combined amount, and Mo in an amount in the range of 1–12 weight percent of such combined amount. Alloys of the invention may exhibit single phase or multiphase microstructure and crystallographic texture.

Magnets made of such alloys may be shaped, e.g., by cold drawing, rolling, bending, or flattening and may be used in devices such as, e.g., electrical contact switches, hysteresis motors, and other magnetically actuated devices.

Preparation of alloys of the invention may comprise uniaxial deformation and aging. Aging is preferably carried out at a temperature at which an alloy is in a two-phase or multiphase state.

DETAILED DESCRIPTION

Figure 1:
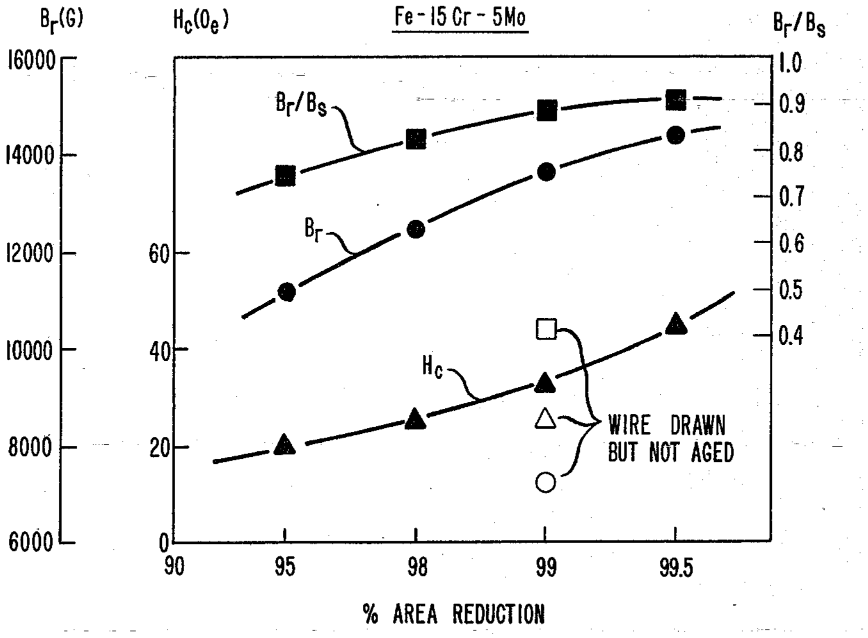
FIG. 1 graphically shows magnetic properties of an Fe-15Cr-5Mo alloy as a function of percent area reduction by wire drawing (a 0.21 inch diameter rod was annealed at a temperature of 1100 degrees C. for a period of 15 minutes, wire drawn resulting in cross-sectional area reduction as shown on the horizontal axis, and aged at a temperature of 670 degrees C. for a period of 5 hours)

Semihard magnet properties are conveniently defined as remanent magnetic induction, $B_r$, greater than 7000 gauss, coercive force, $H_c$, greater than 1 oersted and squareness ratio, $B_r/B_s$, greater than 0.7. Alloys having such properties are suited for use in magnetically actuated devices which may be conveniently characterized in that they comprise a component whose position is dependent on strength, direction, or presence of a magnetic field, and further in that they comprise means such as, e.g., an electrical contact for sensing the position of such component.

In accordance with the invention, it has been realized that Fe-Cr-Mo alloys which preferably comprise Fe, Cr, and Mo in a preferred combined amount of at least 95 weight percent and preferably at least 99 weight percent, Cr in an amount in the range of 6–16 weight percent of such combined amount, and Mo in an amount in the range of 1–12 weight percent of such combined amount, can be produced to have desirable semihard anisotropic magnet properties. More narrow preferred ranges are 12–18 weight percent Cr and 2–8 weight percent Mo. Alloys of the invention may comprise small amounts of additives such as, e.g., Co for the sake of enhanced magnetic properties. Other elements such as, e.g., Ni, Mn, Si, Al, Cu, V, Ti, Nb, Zr, Ta, Hf, and W may be present as impurities in individual amounts preferably less than 0.2 weight percent and in a combined amount preferably less than 0.5 weight percent. Similarly, elements C, N, S, P, B, H, and O are preferably kept below 0.1 weight percent individually and below 0.5 weight percent in combination. Minimization of impurities is in the interest of maintaining alloy formability, e.g., for development of anisotropic structure as well as for shaping into desired form. Excessive amounts of elements mentioned may reduce magnetic saturation and may interfere with texture formation, thereby lowering magnetic properties.

Magnetic alloys of the invention possess anisotropic, single phase or multiphase fine-grained structure. Anisotropic, elongated grains have preferred aspect ratio of at least 10 and preferably at least 50 before aging; aspect ratio may be conveniently defined as length-tc-diameter ratio when deformation is uniaxial such as, e.g., by wire drawing, and as length-to-thickness ratio when deformation is planar such as, e.g., by rolling. (Length is measured in the direction of greatest elongation and diameter or thickness in a direction of greatest reduction.) Grain diameter or thickness is typically less than or equal to 5 micrometers and preferably less than or equal to 2 micrometers; such fine-grained structure is in the interest of high ductility for subsequent forming.

Squareness ratio, $B_r/B_s$, of alloys of the invention is typically greater than or equal to 0.85, magnetic coercivity is in the range of 2–200 oersted, and magnetic remanence is in the range of 12000–18000 gauss.

Alloys of the invention may be prepared, e.g., by casting from a melt of constituent elements Fe, Cr, and Mo in a crucible or furnace such as, e.g., an induction furnace; alternatively, a metallic body having a composition within the specified range may be prepared by powder metallurgy. Preparation of an alloy and, in particular, preparation by casting from a melt calls for care to guard against inclusion of excessive amounts of impurities as may originate from raw materials, from the furnace, or from the atmosphere above the melt. To minimize oxidation or excessive inclusion of nitrogen, it is desirable to prepare a melt with slag protection, in a vacuum, or in an inert atmosphere.

Cast ingots of an alloy of the invention may typically be processed by hot working, cold working, and solution annealing for purposes such as, e.g., homogenization, grain refining, shaping, or the development of desirable mechanical properties.

Processing to achieve desirable anisotropic structure may be by various combinations of sequential processing steps. A particularly effective processing sequence comprises: (1) annealing at a temperature in a range of 800–1250 degrees C. corresponding to a predominantly alpha phase, (2) rapid cooling, (3) severe cold deformation, e.g., by drawing, swagging, or rolling, and (4) aging at a temperature in a preferred range of approximately 500–800 degrees C. and for times in a typical range of approximately 5 minutes to 10 hours. Among benefits of such aging heat treatment is enhancement of coercive force, $H_c$, and squareness, $B_r/B_s$, of the B-H loop as may be due to one or several of metallurgical effects such as, e.g., formation of precipitates such as, e.g., Cr-Mo, Cr-Fe, Mo-Fe, or Cr-Mo-Fe phases.

Deformation in step (3) may be at room temperature or at any temperature in the general range of $-196$ degrees C. (the temperature of liquid nitrogen) to 500 degrees C. If deformation is carried out at a temperature above room temperature, the alloy may subsequently be air cooled or water quenched. Preferred deformation is uniaxial such as, e.g., by wire drawing, and results in cross-sectional area reduction of at least 90 percent and preferably at least 95 or even 98 percent. Such deformation may serve several purposes and, in particular, enhances the coercive force of an alloy and may help to develop anisotropic texture. Also, deformation may serve to enhance kinetics of subsequent aging in a two-phase or multiphase range. Ductility adequate for deformation is assured by limiting the presence of impurities.

To facilitate drawing, e.g., through inexpensive carbide dies, the alloys of the invention may be coated with a lubricating material such as, e.g., copper. Such coating may be left on the final product or may be stripped after or in between drawing steps. A coating of Cu, in particular, affects neither cold formability of drawn wire (such as, e.g., by flattening) nor ultimate magnetic properties after aging of a coated alloy. Such coating may be used for its corrosion resistance and ease of soldering.

Ultimate magnetic properties of an alloy depend on aging temperature and time as well as on amount of deformation.

Alloys of the invention remain highly ductile even after severe deformation such as, e.g., by cold drawing resulting in 95 to 99.5 percent area reduction. Such deformed alloys may be further shaped, e.g., by bending or flattening without risk of splitting or cracking. Bending may produce a change of direction of up to 30 degrees with a bend radius not exceeding thickness. For bending through larger angles, safe bend radius may increase linearly to a value of 4 times thickness for a change of direction of 90 degrees. Flattening may produce a change of width-to-thickness ratio of at least a factor of 2.

Figure 2:
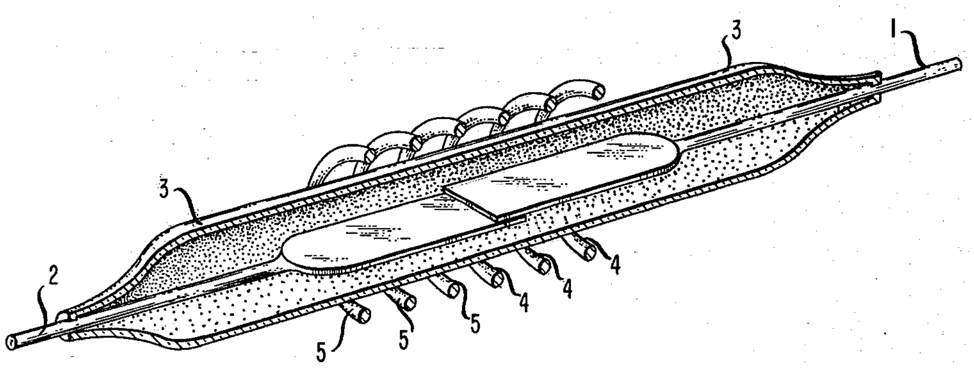
FIG. 2 shows a reed switch assembly comprising Fe-Cr-Mo reeds according to the invention.

High formability in the wire-drawn state is of particular advantage in the manufacture of devices such as reed switches exemplified in FIG. 2 which shows flattened reeds 1 and 2 made of an Fe-Cr-Mo alloy and extending through glass encapsulation 3 which is inside magnetic coils 4 and 5.

Alloys of the invention are more ductile than prior art Co-Fe alloys such as, e.g., Remendur. While the latter typically require high temperature annealing of drawn wires for softening prior to cold flattening, no such annealing is required in the case of alloys of the invention and, as a result, magnetic properties, magnetic anisotropy, and surface quality of drawn wire is retained. High effective magnetic flux near the paddle section of reeds is significant for switching performance.

In addition to being readily cold formable, alloys of the invention also remain highly ductile after aging as is desirable for ease of handling of encapsulated switch assemblies. In particular, reed portions exposed to strain may bend, leaving a glass-to-reed seal intact. Alloys of the invention are sufficiently ductile to allow bending through an angle of 30 degrees when bend radius equals article thickness. Formability and ductility are enhanced by minimization of the presence of impurities and, in particular, of elements of groups 4b and 5b of the periodic table.

Among desirable properties of Fe-Cr-Mo semihard magnetic alloys are the following:

(1) high magnetic squareness as is desirable in switching and other magnetically actuated devices, (2) abundant availability of constituent elements Fe, Cr, and Mo, (3) ease of processing and forming due to high formability and ductility, both before and after aging, (4) low magnetostriction as may be specified by a saturation magnetostriction coefficient not exceeding $25\times10^{-6}$ and preferably not exceeding $16\times10^{-6}$ as may be desirable, e.g., to minimize sticking of reed contacts, (5) ease of plating with contact metal such as, e.g., gold, (6) excellent rust resistance under normal atmospheric conditions, so that alloy surface remains essentially rust-free for at least 6 months and typically for at least 5 years (thus ensuring essentially constant air gap between magnetic parts); excellent corrosion resistance during chemical processing of reeds (e.g., by acid or acid water cleaning, hot water rinsing, and gold plating); and excellent oxidation resistance during hot working or heat treating, and at the time of sealing to a glass encapsulation, and (7) ease of sealing, without cracking, to high-lead infrared sealing glass as customarily used to encapsulate Remendur reed switches.

Preparation and properties of Fe-Cr-Mo semihard magnets according to the invention are further illustrated by the following example.

EXAMPLE

Reed elements were made according to the invention from an Fe-15Cr-5Mo alloy. A 0.21 inch diameter rod of the alloy was solution annealed at a temperature of 1100 degrees C. for 15 minutes, water cooled, and wire drawn to a 0.021 inch diameter. A section of the wire was flattened to produce a paddle-shaped reed switch element which then was aged for 2 hours at a temperature of 650 degrees C. Measurement of magnetic properties of the flattened portion of the reed element yielded the following values (comparison values for a prior art reed element having the same geometry but made of a Remendur alloy are shown in parentheses for the sake of comparison): Coercivity $H_c$=28 Oe (27 Oe), and remanence $B_r$=10.1 Maxwell turns (9.4 Maxwell turns). Similarly, measurement of magnetic properties of the remaining cylindrical portion yielded the values $H_c$=29 Oe (24 Oe), and $B_r$=6.5 Maxwell turns (5.6 Maxwell turns).

I claim:

1. Anisotropic magnetic alloy comprising an amount of at least 99 weight percent Fe, Cr, and Mo, Cr being in the range of 6–26 weight percent of said amount and Mo being in the range of 1–12 weight percent of said amount, said alloy comprising elements Ni, Mn, Si, Al, Cu, V, Ti, Nb, Zr, Ta, Hf, and W in individual amounts of less than 0.2 weight percent of said alloy and less than 0.5 weight percent of said alloy in combination, said alloy comprising elements C, N, S, P, B, H, and O in individual amounts of less than 0.1 weight percent of said alloy and less than 0.5 weight percent of said alloy in combination, said alloy having magnetic squareness ratio greater than or equal to 0.85, and said alloy having remanence greater than or equal to 12000 gauss.

2. Alloy of claim 1 in which Cr is in the range of 12–18 weight percent of said amount and Mo is in the range of 2–8 weight percent of said amount.

3. Alloy of claim 1 having sufficient ductility after cold drawing to allow bending through an angle of 30 degrees and with a bend radius equal to thickness.

4. Alloy of claim 1 having sufficient ductility after aging to allow bending through an angle of 30 degrees and with a bend radius equal to thickness.

5. Alloy of claim 1 having grain structure in which aspect ratio is greater than or equal to 10.

6. Alloy of claim 5 in which said ratio is greater than or equal to 50.

7. Alloy of claim 1 in which grain diameter or thickness is less than or equal to 5 micrometers.

8. Alloy of claim 7 in which grain diameter or thickness is less than or equal to 2 micrometers.

* * * * *

UNITED STATES PATENT AND TRADEMARK OFFICE

CERTIFICATE OF CORRECTION

PATENT NO. : 4,337,100

DATED : June 29, 1982

INVENTOR(S) : Sungho Jin

It is certified that error appears in the above-identified patent and that said Letters Patent are hereby corrected as shown below:

Column 2, line 31, "6-16" should read --6-26--.

Signed and Sealed this

***Twenth-eighth* Day of *September 1982***

[SEAL]

*Attest:*

GERALD J. MOSSINGHOFF

*Attesting Officer* *Commissioner of Patents and Trademarks*